310-369 SR

XR 3,610,969

[redacted]

[11] 3,610,969

[72] Inventors Charles D. Clawson;
Joseph F. Riley, both of Attica, Ind.

[21] Appl. No. 9,314
[22] Filed Feb. 6, 1970
[45] Patented Oct. 5, 1971
[73] Assignee P. R. Mallory & Co. Inc.
Indianapolis, Ind.

[54] MONOLITHIC PIEZOELECTRIC RESONATOR FOR USE AS FILTER OR TRANSFORMER
21 Claims, 10 Drawing Figs.

[52] U.S. Cl. .................................................... 310/8.1, 29/25.35, 29/472.9, 310/8.2, 310/9.1, 310/9.6, 310/9.8, 333/72
[51] Int. Cl. .................................................... H01v 7/00
[50] Field of Search .................................................... 310/9.6, 9.7, 9.8, 9.1, 9.4, 9.2, 8.6, 9.3, 8.9, 8, 8.1, 8.2, 8.3, 8.5, 8.7; 333/72; 29/25.35, 472.9

[56] References Cited

UNITED STATES PATENTS

| | | | |
|---|---|---|---|
| 3,433,982 | 3/1969 | Kaname et al. | 310/9.7 X |
| 3,403,358 | 9/1968 | Kolm | 333/72 |
| 2,474,241 | 6/1949 | Garrison | 310/9.7 X |
| 2,882,462 | 5/1959 | Zierdt | 310/9.4 X |
| 3,145,311 | 8/1964 | Dickey | 310/8.6 X |
| 2,203,486 | 6/1940 | Bond | 310/8.9 X |
| 3,489,931 | 1/1970 | Teaford | 310/9.7 X |
| 3,345,588 | 10/1967 | Chesney | 310/9.1 X |

FOREIGN PATENTS

| | | | |
|---|---|---|---|
| 386,141 | 4/1965 | Switzerland | 310/9.4 |

*Primary Examiner*—D. F. Duggan
*Assistant Examiner*—B. A. Reynolds
*Attorneys*—Richard H. Childress, Robert F. Meyer, Henry W. Cummings and C. Carter Ells

ABSTRACT: A piezoelectric ceramic device including a plurality of piezoelectric ceramic plates adhered together by a metallic inner electrode. At least one of the plates has an aperture for receiving a connecting lead to the metallic inner electrode. The ceramic plates are formed as a monolithic unit by being integrally fused together through the inner electrode. The device can be used as a filter or transformer in an electrical circuit.

INVENTORS
JOSEPH F. RILEY
CHARLES D. CLAWSON

INVENTORS
JOSEPH F. RILEY
CHARLES D. CLAWSON

MONOLITHIC PIEZOELECTRIC RESONATOR FOR USE AS FILTER OR TRANSFORMER

This invention relates to piezoelectric devices and, more particularly, to such ceramic devices capable of functioning as a filter or impedance transformer in an electrical circuit.

Piezoelectric ceramic transformers used in electrical circuits to match circuits with different impedance levels and having a low loss to a selected band of frequencies and having particular application as an interstage filter in I. F. amplifier circuits are known in this art.

Such piezoelectric devices of the prior art, however, have many deficiencies and/or limitations to various degrees among which include the ability to be easily and efficiently tuned to a selected band of frequencies; a relatively wide range of impedance matching for similar dimensional devices; a device having a relatively low vibration loss; and an easy and efficient mounting means for such a device. As can be appreciated, a device which overcomes or minimizes the deficiencies and/or limitations of the prior art, particularly those set forth above, would represent an advancement in this art.

It is, therefore, an object of the present invention to provide a piezoelectric device which can be easily and efficiently tuned to a selected band of frequencies.

It is another object of the present invention to provide a piezoelectric device exhibiting a relatively wide range of impedance matching for similar dimensional devices.

It is another object of the present invention to provide a piezoelectric device exhibiting a relatively low vibration loss.

It is another object of the present invention to provide a piezoelectric device having an easy and efficient mounting means therefor.

It is a further object of the present invention to provide a piezoelectric device exhibiting a frequency which is dependent to a significant degree on the diameter thereof, an impedance dependent to a significant degree on the thickness thereof, a relatively low filter loss, and relatively high impedance ratios, as high as 110 (with a loss of less than 2 db.) or even higher.

It is a still further object of the present invention to provide a method for making a piezoelectric device.

Other objects and advantages, as well as modifications obvious to one skilled in the arts to which the invention pertains, will become apparent from the following description and claims taken in conjunction with the accompanying drawings in which:

In general, the present invention is directed to various aspects, both individually and collectively, of a piezoelectric device having a monolithic unit comprised of a plurality of piezoelectric ceramic plates with the faces thereof in substantially parallel alignment, the plates integrally fused together with a metallic inner electrode therebetween, at least one of the plates having an aperture for receiving an electrical or connecting lead to the inner electrode, all as more fully discussed hereinafter.

The piezoelectric ceramic materials which can be employed include one or more ferroelectric ceramic materials which can be electrically polarizable to exhibit piezoelectric properties. Typical examples of such ceramic materials include barium titanate, lead titanate, lead zirconate and the rare earth oxides and the combinations thereof.

Metals which can be employed as electrodes include metallic conductors and their alloys. Preferably such metals should not deleteriously react or alloy with the constituents, such as the metallic constituents, of the ceramic material. This is especially important for the metallic inner electrode. Typical metallic electrodes include high temperature metals and alloys which have melting points at or above the sintering temperature of the piezoelectric ceramic material such as refractory metals i.e., tungsten, molybdenum and the like and alloys containing such, and the noble metals such as palladium, platinum, gold and silver and alloys containing such.

Figures 1, 2, 3, 4, 5, 6, 7:
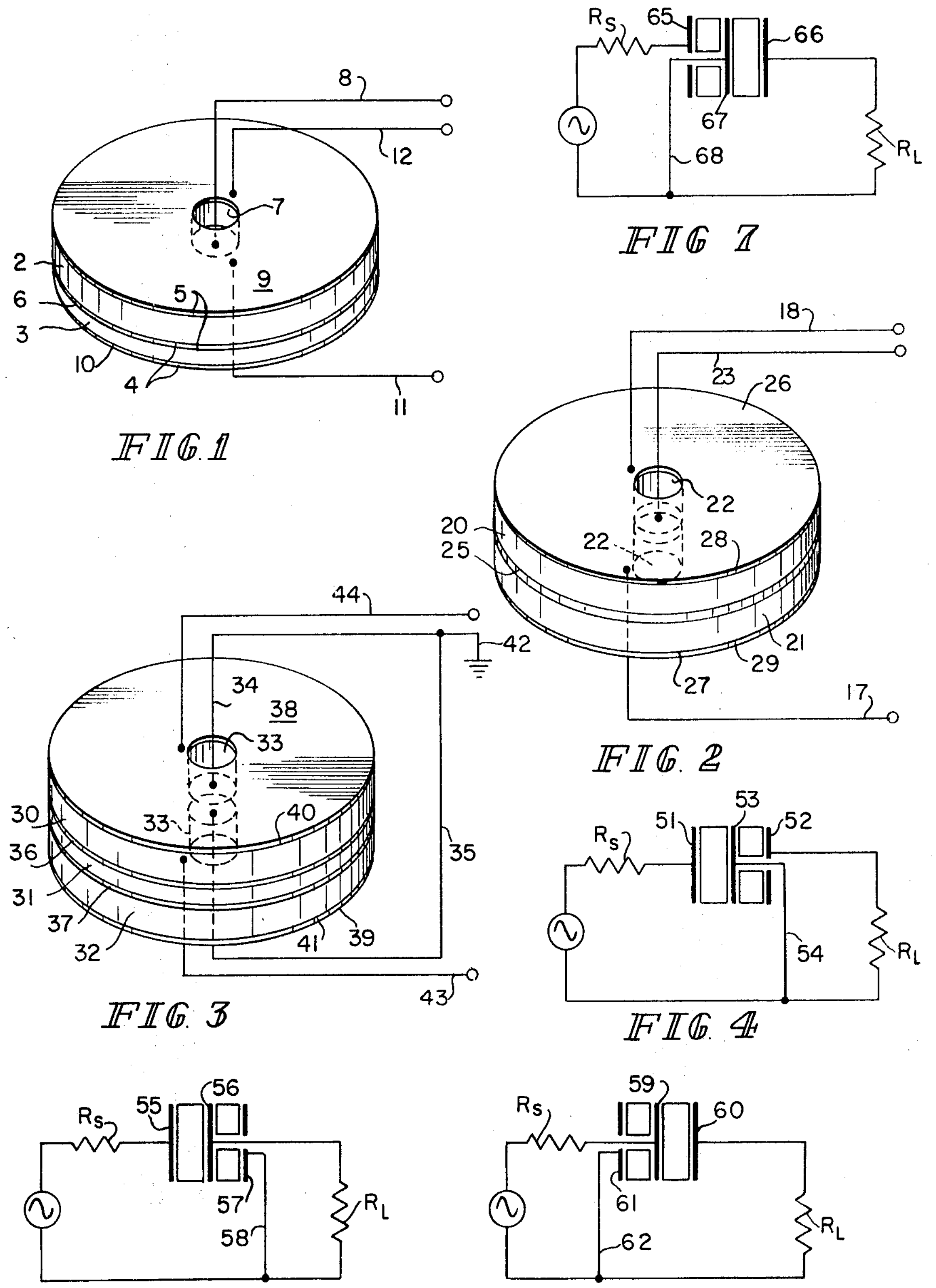
FIG. 1 is a perspective view from above of one piezoelectric device embodiment of the present invention.
FIG. 2 is a perspective view from above of another piezoelectric device embodiment of the present invention.
FIG. 3 is a perspective view from above of still further piezoelectric device embodiment of the present invention.
FIG. 4 is the device embodiment of FIG. 1 schematically illustrating one manner for coupling together a source and a load.
FIG. 5 is the device embodiment of FIG. 1 schematically illustrating another manner for coupling together a source and a load.
FIG. 6 is the device embodiment of FIG. 1 schematically illustrating a further manner for coupling together a source and a load.
FIG. 7 is the device embodiment of FIG. 1 schematically illustrating a still further manner for coupling together a source and a load.

Referring to the drawings and, more particularly, FIG. 1, a piezoelectric ceramic device embodiment of the present invention is shown. This embodiment 1 comprises a pair of flat bodies or plates 2 and 3, of a piezoelectric ceramic material which is polarized in the thickness direction, that is, the axis of polarization is substantially perpendicular to the main surfaces or faces, 4 and 5, of the bodies. The bodies can take many and various peripheral shapes which include a circle, a square with or without rounded corners, polygon and the like. Preferred, however, is the circle shape thus resulting in a disc-shaped body. Moreover, each body can vary in thickness and the bodies can be of substantially the same thickness or different thicknesses. The faces, 4 and 5, for each body are substantially or approximately parallel and thus the bodies are substantially or approximately parallel to each other. The bodies are integrally adhered or fused to one another through the inner metallic electrode layer 6, thus resulting in a monolithic unit. Body 2 is provided with an aperture 7 for receiving an electrical lead 8 attached to or in contact with the inner electrode 6. The aperture can be positioned in many and various locations in the body although preferably it is positioned at a nodal point of the body for better efficiency due to, among other things, less dampening effect on the body. Outer electrodes, 9 and 10, are applied or attached to exposed face 5 of body 2 and exposed face 4 of body 3. Many outer electrode shapes are contemplated within the invention such as triangular, rectangular, polygonal and the like depending upon, among other things, the particular shape of the bodies and such are preferred which substantially or approximately cover the exposed outer faces of the bodies. Electrical leads 11 and 12 may be soldered or otherwise connected to electrodes 10 and 9, respectively, at or near the nodal points of the bodies.

The piezoelectric ceramic device of the present invention can be prepared by many and various methods which include forming the bodies by conventional procedures such as pressure pressing ceramic material powder in a cavity or die having the general shape of the bodies. The bodies can be further processed according to conventional procedures including heating to burn out the binder, if used, and sintering or firing for maturing the bodies. The bodies can then have a metallic electrode paste or paint applied therebetween, preferably a noble metal paste or paint, and the exposed surfaces have outer electrodes applied thereto and the entire component fired for fusing the bodies through the inner metallic electrode to form an integral or monolithic unit which can be further processed as such. For example, using a silver paste for the inner electrode, the bodies having such paste pressed therebetween can be fired at about 1400° F. to about 1600° F. for about 30 minutes to about 60 minutes in order to diffuse some of the silver into each body and thus form an integral or monolithic unit. The unit can be polarized, as previously discussed, in a direction from one outer electrode to the other outer electrode. It is further possible to apply the inner metallic electrode paste or paint between the bodies as well as having the outer electrodes applied thereto prior to sintering or firing the bodies in order that both procedures, that is, the maturing of the bodies and the fusing or adhering the bodies through the inner electrode, can be carried out in essentially one step. For example, using a platinum paste for the inner electrode, the bodies having such paste pressed therebetween can be fired at the sintering temperature of the piezoelectric ceramic material. It is still further possible to adhere the bodies and the inner electrode therebetween together using materials such as adhesives and the like, however, it is preferred that the bodies form an integral or monolithic unit through the inner metallic electrode. The metallic outer electrodes can be applied by many and various methods which include coating the desired surface of the body with a paste or finely divided dispersion of the metal by a silk screen process and then drying or by screening or open mesh methods utilizing metallic paints or pastes and then drying, or by direct application methods which include forming a metallic electrode layer by sputtering, electroless disposition, vapor disposition and the like. Since the device is formed with a monolithic unit many and various features and advantages result therefrom including the ability to tune or adjust the unit in frequency by mechanically grinding or abrading the edge of the unit since the frequency thereof is dependent to a significant degree on its cross-sectional area, and the ability to operate with minimum vibration loss.

Referring to the drawings and, more particularly, FIG. 2, another piezoelectric ceramic device embodiment is shown. This embodiment comprises a pair of flat bodies or plates, 20 and 21, of a piezoelectric ceramic material similar to those described for FIG. 1. In this instance, however, both bodies, 20 and 21, are provided with an aperture 22 for receiving an electrical lead such as 23 attached to or in contact with the inner electrode 25. The inner electrode in this instance may be a metallic layer or foil in order to improve the unit's structural strength. Outer electrodes, 26 and 27, are applied or attached to expose face 28 of body 20 and exposed face 29 of body 21. Electrical leads 17 and 18 may be soldered or otherwise connected to electrodes 27 and 26, respectively, at or near the nodal points of the bodies.

Referring to the drawings and, more particularly, FIG. 3 a still further piezoelectric ceramic device embodiment is shown illustrating that several bodies or plates of piezoelectric ceramic material can be employed in the device by practicing the teachings of the present invention. This embodiment comprises three flat bodies or plates 30, 31 and 32, of a piezoelectric ceramic material similar to those described for FIG. 1. In this instance, however, both exposed bodies 30 and 32 are provided with an aperture 33 for receiving electrical leads 34 and 35 attached to or in contact with a pair of inner electrodes 36 and 37. Outer electrodes, 38 and 39, are applied or attached to exposed face 40 of body 30 and exposed face 41 of body 32. In this embodiment the unit can function, for example, by connecting the leads 34 and 35 to a single lead 42. The unit can also function as a four terminal device by not connecting leads 34 and 35. Electrical leads 43 and 44 may be soldered or otherwise connected to electrodes 39 and 38, respectively, at or near the nodal points of the bodies.

Referring to the drawings and, more particularly, FIGS. 4, 5, 6, and 7, which schematically illustrate various ways for electrically connecting a device of the present invention. In FIGS. 4, 5, 6, and 7, $R_s$ and $R_L$ represent source resistance and load resistance, respectively. In FIG. 4 the input electrode is outer electrode 51, the output electrode is outer electrode 52, and the inner electrode 53 is connected to lead 54 and to ground. In FIG. 5, however, the input electrode is outer electrode 55, the output electrode is inner electrode 56, and outer electrode 57 is connected to lead 58 and to ground. In FIG. 6 the input electrode is inner electrode 59, the output electrode is outer electrode 60 and outer electrode 61 is connected to lead 62 and to ground. In FIG. 7, the input electrode is outer electrode 65, the output electrode is outer electrode 66, and the inner electrode 67 is connected to lead 68 and to ground. As can be appreciated from the foregoing, a device of the present invention can be electrically connected and utilized in many and various ways depending, for example, on the impedance level desired and such represents an advantageous feature of the device.

Figure 8:
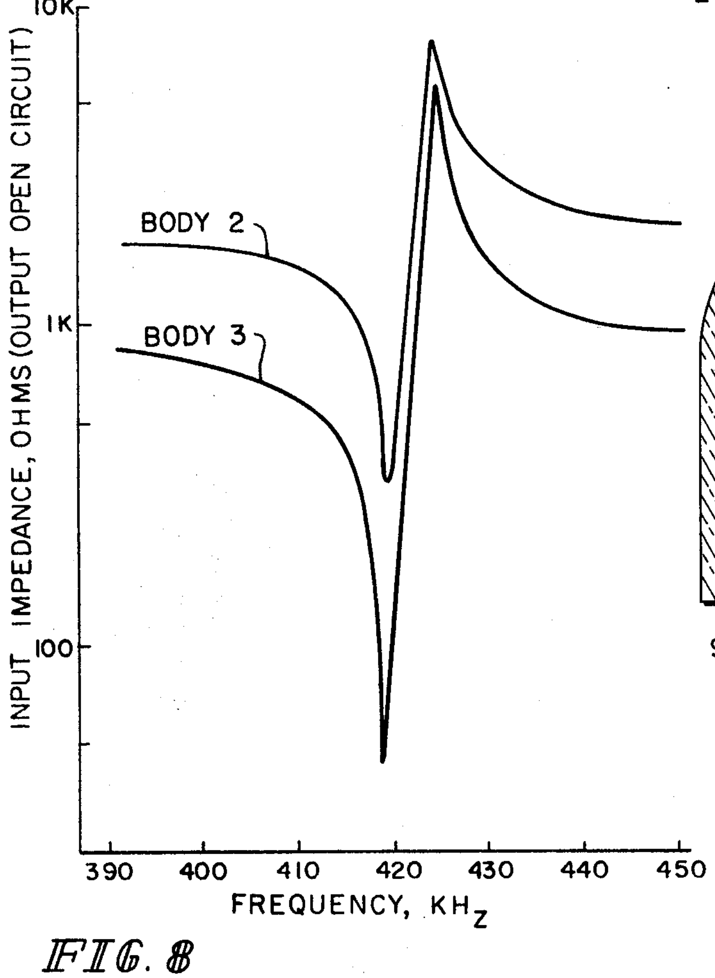
FIG. 8 is a graphic representation of input impedance, with an open output circuit, versus frequency for each portion of the device embodiment of FIG. 1.

Referring to the drawings and, more particularly, FIG. 8, a graphic representation is illustrated which shows a typical input impedance, with an open output circuit, versus frequency for body 2 and body 3 of the device embodiment of FIG. 1. Thus, at given frequencies an impedance ratio can be achieved since the input impedance of body 2 is greater than the input impedance of body 3.

Figure 9:
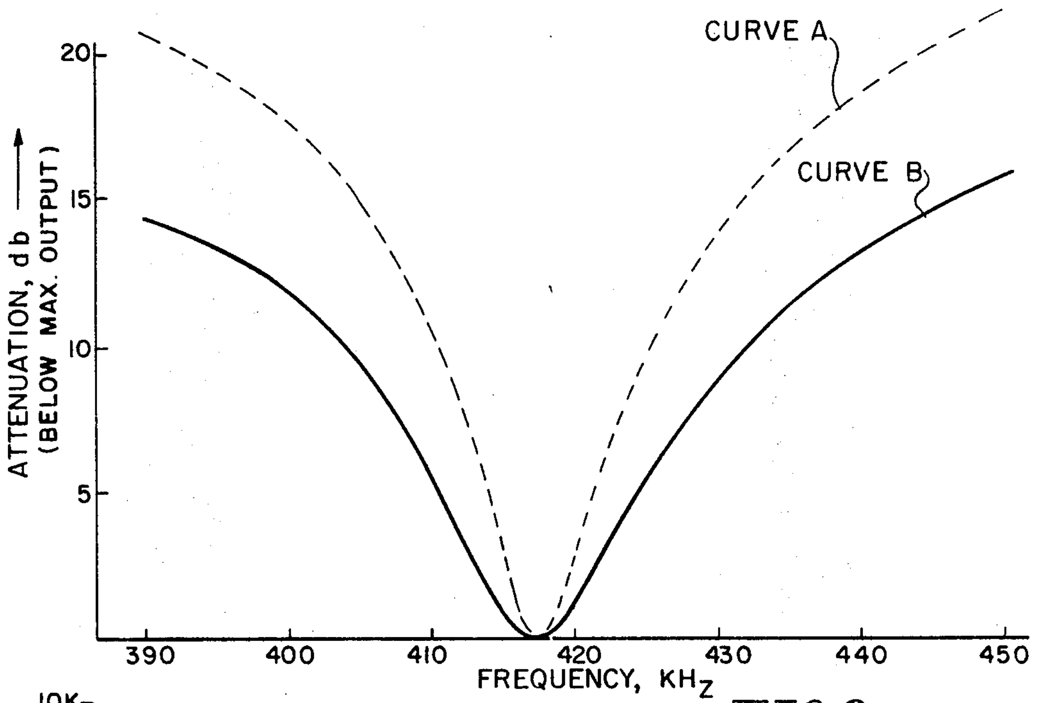
FIG. 9 is a graphic representation of attenuation versus frequency for two different impedance level conditions using the device embodiment of FIG. 1.

Referring to the drawings and, more particularly, FIG. 9, a graphic representation is illustrated which shows typical frequency response curves under certain impedance conditions. The device embodiment of FIG. 1 is connected in the manner shown in FIG. 4 and curve A is for an $R_s$ of 120 ohms and an $R_L$ of 5,000 ohms and curve B is for an $R_s$ of 300 ohms and an $R_L$ of 1,200 ohms.

Figure 10:
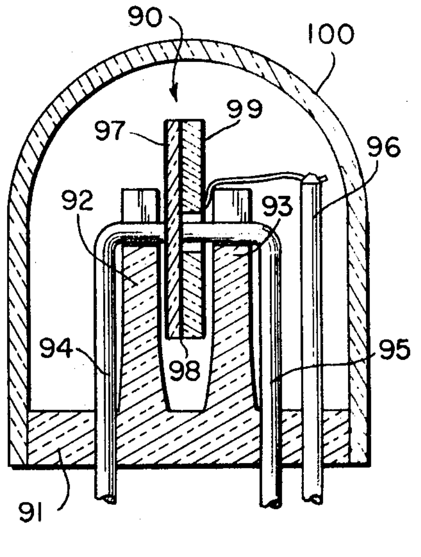
FIG. 10 is a cross section illustration of the device embodiment of FIG. 1 mounted in a housing.

Referring to the drawings and, more particularly, FIG. 10, a device embodiment of FIG. 1 mounted in a housing is illustrated. The device includes, in addition to the piezoelectric device 90, a base means 91 having a pair of post means 92 and 93. Lead connections 94, 95 and 96 pass through the base means 91. The lead connection 94 passes through and is supported by post means 92; whereas, lead connection 95 passes through and is supported by post means 93. These two lead connections support the device by pressure contact at the nodal point thereof such that the device is firmly held therebetween. If desired or required, dimples may be provided in electrode 97 and inner electrode 98 in order to aid in locating and maintaining the pressure contact mounting. Lead connection 96 is a post and flexible extension or lead which can be adhered or affixed such as by solder or the like to electrode 99 at or near the nodal point. In the same manner, lead connections 94 and 95 can, if desired, be adhered or affixed to electrodes 97 and 98. An envelope or cover 100 can then be positioned around the periphery of the base means 91 to provide an enclosure or housing for the device. As can be appreciated, the particular lead connections for the pressure contact, if used, can be varied depending upon, among other things, the particular device and manner of electrically connecting it in the electrical circuit.

We claim:

1. A piezoelectric device useful as a filter or impedance transformer in an electrical circuit comprising:
   - a plurality of piezoelectric ceramic plates with the faces thereof in substantially parallel alignment,
   - said ceramic plates adhered with a metallic inner electrode therebetween,
   - at least one of said ceramic plates having an aperture therein for receiving a connecting lead to said inner electrode, and
   - each exposed face of said ceramic plates having a metallic electrode thereon.

2. A device according to claim 1, wherein said ceramic plates are integrally fused together with said metallic inner electrode therebetween to form a monolithic unit.

3. A device according to claim 2, wherein said ceramic plate has said aperture at substantially its nodal point.

4. A device according to claim 3, wherein said ceramic plates are disc-shaped.

5. A device according to claim 4, wherein said plurality of piezoelectric ceramic plates embody a pair of said plates.

6. A device according to claim 5, wherein said metallic inner electrode is a noble metal material.

7. A device according to claim 6, wherein said noble metal material is selected from the group consisting of silver and platinum materials.

8. A device according to claim 4, wherein said plurality of piezoelectric ceramic plates embody a pair of said ceramic plates, each of said ceramic plates having an aperture therein.

9. A device according to claim 8, wherein said metallic inner electrode is a noble metal material.

10. A device according to claim 9, wherein said noble metal material is selected from the group consisting of silver and platinum materials.

11. A device according to claim 4, wherein said plurality of piezoelectric ceramic plates embody three ceramic plates, adhered with two metallic inner electrodes therebetween, each said outer ceramic plates having an aperture therein for receiving a connecting lead to each said inner electrode.

12. A device according to claim 11, wherein said metallic inner electrode is a noble metal material.

13. A device according to claim 12, wherein said noble metal material is selected from the group consisting of silver and platinum materials.

14. A device according to claim 1, including a mounting means comprising a base means provided with post means for supporting lead connections to said device, said lead connections holding said device therebetween.

15. A device according to claim 14, wherein said base means is provided with a pair of post means, each post means supporting a lead connection for holding said device therebetween by pressure contact.

16. A device according to claim 15, further including a cover positioned around said device.

17. A process for preparing the device of claim 2, comprising forming said ceramic plates with a metal electrode material applied therebetween and firing said unit at a temperature and for a time sufficient to fuse said plates through said metal electrode to form a monolithic unit.

18. A process according to claim 17, wherein said metal electrode material is a noble metal paste material.

19. A process according to claim 18, wherein said noble metal paste is a silver material and said unit is fired at a temperature of about 1400° F. to about 1600° F.

20. A process according to claim 18, wherein said plates are matured during said firing of said unit.

21. A process according to claim 20, wherein said noble metal paste is a platinum material and said unit is fired at the sintering temperature of the piezoelectric ceramic material.